United States Patent
Murata et al.

(10) Patent No.: US 10,101,148 B2
(45) Date of Patent: Oct. 16, 2018

(54) OCT APPARATUS

(71) Applicant: NIDEK CO., LTD., Gamagori, Aichi (JP)

(72) Inventors: Keiji Murata, Aichi (JP); Masaaki Hanebuchi, Aichi (JP)

(73) Assignee: NIDEK CO., LTD., Gamagori, Aichi (JP)

( * ) Notice: Subject to any disclaimer, the term of this patent is extended or adjusted under 35 U.S.C. 154(b) by 0 days.

(21) Appl. No.: 15/782,300

(22) Filed: Oct. 12, 2017

(65) Prior Publication Data

US 2018/0135962 A1 May 17, 2018

(30) Foreign Application Priority Data

Oct. 13, 2016 (JP) .................................. 2016-202140

(51) Int. Cl.
*G01B 11/02* (2006.01)
*G01B 9/02* (2006.01)

(52) U.S. Cl.
CPC ..... *G01B 9/02091* (2013.01); *G01B 9/02004* (2013.01); *G01B 9/02007* (2013.01)

(58) Field of Classification Search
CPC .............. A61B 5/0066; G01B 9/02091; G01B 9/02004; G01B 9/02007; G01B 9/02083; G01B 9/02062; G01B 9/0207; G01B 9/02075
USPC ................................................ 356/497, 479
See application file for complete search history.

(56) References Cited

U.S. PATENT DOCUMENTS

| | | | |
|---|---|---|---|
| 7,864,331 B2 * | 1/2011 | Teramura | A61B 5/0066 356/479 |
| 2010/0309482 A1 * | 12/2010 | Oikaze | G01B 11/2441 356/601 |
| 2013/0208968 A1 * | 8/2013 | Hanebuchi | G06T 5/002 382/131 |
| 2015/0094978 A1 | 4/2015 | Hanebuchi et al. | |
| 2015/0330769 A1 | 11/2015 | Yamada et al. | |

FOREIGN PATENT DOCUMENTS

| | | |
|---|---|---|
| JP | 2014-115280 A | 6/2014 |
| JP | 2015-68775 A | 4/2015 |

* cited by examiner

*Primary Examiner* — Tarifur Chowdhury
*Assistant Examiner* — Jonathon Cook
(74) *Attorney, Agent, or Firm* — Sughrue Mion, PLLC (57) ABSTRACT

An OCT apparatus includes: a light source unit that includes first and second wavelength sweeping light sources which sequentially emit light with first and second spectrum bandwidths; an SS-OCT optical system that splits the light into measurement light and reference light to receive interference signal light; a second detector that is a deviation detector detecting a phase deviation and a wavelength deviation and detects a signal including pieces of FPN; a calculation processor connecting first and second spectrum interference signals and processes the connected spectrum interference signals to acquire an OCT image and that obtains the phase deviation and the wavelength deviation; and a correction unit that corrects the phase deviation and the wavelength deviation and corrects the phase deviation and the wavelength deviation obtained by the calculation processor.

13 Claims, 8 Drawing Sheets

WHEN THERE IS WAVELENGTH
DEVIATION AND THERE IS
NO PHASE DEVIATION

FIG.5

WHEN THERE IS WAVELENGTH DEVIATION AND THERE IS PHASE DEVIATION

FIG.6

WHEN THERE IS NO WAVELENGTH DEVIATION AND THERE IS NO PHASE DEVIATION EITHER

OCT APPARATUS

BACKGROUND

The present disclosure relates to an OCT apparatus obtaining an OCT image of a subject (for example, an eye).

There are known swept source optical coherence tomography (SS-OCT) apparatuses that include a plurality of wavelength sweeping light sources and obtain tomographic images by connecting an interference signal by a first wavelength sweeping light source and an interference signal by a second wavelength sweeping light source.

Related art: JP-A-2014-115280

SUMMARY

Incidentally, in the foregoing configuration, a phase difference between spectra emitted from two wavelength sweeping light sources is detected using a single reference signal and feedback is performed so that an SN ratio of a tomographic image is maximized in regard to a wavelength difference between the spectra.

However, when the feedback is performed, it is necessary to perform calculation a plurality of times. When problems arise in that it is not sure whether accurate wave number connection is made and sensitivity is not obtained, it is difficult to detect whether a wavelength is incorrect or whether a phase is incorrect.

The present disclosure is devised in view of at least one problem of the foregoing technology of the related art and an object of the present disclosure is to provide an OCT apparatus capable of appropriately acquiring an OCT image using a plurality of wavelength sweeping light sources.

To resolve the foregoing problem, the present disclosure is realized with the following configurations.

An OCT apparatus includes: a light source unit that includes a first wavelength sweeping light source sweeping an emission wavelength in a first spectrum bandwidth and a second wavelength sweeping light source sweeping an emission wavelength in a second spectrum bandwidth and that sequentially emits the light with the first spectrum bandwidth and the light with the second spectrum bandwidth; an SS-OCT optical system that splits the light emitted from the first and second wavelength sweeping light sources into measurement light and reference light and is configured such that a first detector receives interference signal light in which reflected light of the measurement light from a subject is combined with the reference light; a second detector that is a deviation detector detecting a phase deviation and a wavelength deviation between the first and second wavelength sweeping light sources, the second detector detecting a signal including a plurality of pieces of FPN; a processor; memory storing computer readable instructions, when executed by the processor, causing the OCT apparatus to execute: connecting a first spectrum interference signal by the first wavelength sweeping light source and a second spectrum interference signal by the second wavelength sweeping light source output from the first detector, processing the connected spectrum interference signals to acquire an OCT image and obtaining the phase deviation and the wavelength deviation by processing the plurality of pieces of FPN included in the detected signal from the second detector; and correcting the phase deviation and the wavelength deviation between the first and second spectrum interference signals based on the detected signal from the second deviation detector, and the phase deviation and the wavelength deviation being obtained by the calculation processor.

Advantage of the Invention

According to the present disclosure, it is possible to appropriately acquire an OCT image using a plurality of wavelength sweeping light sources.

DESCRIPTION OF ILLUSTRATIVE EMBODIMENTS

An embodiment of the invention will be described with reference to the drawing. FIGS. 1 to 5 are diagrams according to an example of the embodiment.

An OCT apparatus according to the embodiment may include a plurality of wavelength sweeping light sources. In this case, for example, a phase deviation between spectra emitted from the plurality of wavelength sweeping light sources is acquired by processing first fixed pattern noise (FPN) and a wavelength deviation between the spectra emitted from the plurality of wavelength sweeping light sources may be acquired by processing second FPN noise. The acquired phase deviation and wavelength deviation between the spectra may be used when an OCT image of a subject is obtained based on a spectrum interference signal in which a first spectrum interference signal by a first wavelength sweeping light source and a second spectrum interference signal by a second wavelength sweeping light source are connected.

<Light Source Unit>

An OCT apparatus 1 may include, for example, a light source unit that includes the first wavelength sweeping light source (hereinafter referred to as a first light source) and the second wavelength sweeping light source (hereinafter referred to as a second light source). In this case, the first light source may sweep an emission wavelength in a first spectrum bandwidth and the second light source may sweep an emission wavelength in a second spectrum bandwidth. When the emission wavelength is swept, the emission wavelength may be changed temporally. The light source unit may include three or more wavelength sweeping light sources. In the light source unit, the first and second light sources may be disposed in parallel or may be disposed in series. The first and second light sources may be VCSEL light sources.

The second light source may sweep an emission wavelength in a second spectrum bandwidth different from the first spectrum bandwidth. In this case, for example, the first and second spectrum bandwidths may be spectrum bandwidths continuing as a spectrum, or the second light source may partially overlap the spectrum bandwidth with the spectrum bandwidth of the emission wavelength of the first light source.

The light source unit may be a light source unit capable of sequentially emitting light with the first spectrum bandwidth swept by the first light source and light with the second spectrum bandwidth swept by the second light source. In this case, the light sources may temporally continuously emit the light from the first light source and the light from the second light source or may emit the light from the first light source and emit the light from the second light source after a predetermined time elapses. An emission timing of the light from the first light source and an emission timing of the light from the second light source may partially overlap or the emission of the light from the second light source may start before the emission of the light from the first light source ends.

The light source unit can emit light with a spectrum bandwidth in which the spectrum bandwidth of the light emitted from the first light source matches the spectrum bandwidth of the light emitted from the second light source by sequentially emitting the light from the plurality of wavelength sweeping light sources, and thus it is possible to sweep a wavelength in a broader bandwidth than a single wavelength sweeping light source is used.

<OCT Optical System>

The OCT apparatus may include, for example, an SS-OCT optical system (hereinafter referred to as an OCT optical system) and may split light emitted from the plurality of wavelength sweeping light sources into measurement light and reference light, interference signal light in which reflected light of the measurement light reflected from a subject and reference light are combined may be received by a detector.

The SS-OCT optical system may be a standard OCT that detects reflection intensity of a subject or may be a polarization sensitive OCT (PS-OCT) or a Doppler OCT that detects a phase state of a subject. Of course, the SS-OCT optical system may be a multi-functional OCT in which a PS-OCT and a Doppler OCT are compound.

The OCT optical system (an interference optical system) may have a configuration related to an interference system obtaining an OCT image of a subject using an OCT principle. The OCT apparatus according to the embodiment also includes an optical coherence interference system capable of acquiring only an A-scan OCT signal by a plurality of wavelength sweeping light sources. In this case, the interference optical system may include a splitter (optical splitter), a measurement optical path, a reference optical path, a combiner (optical combiner), and an optical detector. The splitter may split light from the wavelength sweeping light sources into a measurement optical path and a reference optical path. In the splitter and the combiner, for example, a beam splitter, a half mirror, a fiber coupler, and a circulator are used. The measurement optical path may have a configuration for guiding light to a subject. The reference optical path may have a configuration for traveling the reference light into the apparatus and causing the reference light to interfere in the measurement light. The combiner may cause the measurement light reflected from a subject and coming from the measurement optical path to be combined with (interfere in) the reference light from the reference optical path. The detector may be a balanced detector.

<Deviation Detection Unit Detecting Phase Deviation and Wavelength Deviation>

The OCT apparatus may include a deviation detection unit that detects a phase deviation and a wavelength deviation between the first and second light sources. Here, the deviation detection unit may be, for example, a deviation detection unit that detects a phase deviation and a wavelength deviation between a first spectrum signal which is a spectrum signal generated with the light from the first light source and a second spectrum signal which is a spectrum signal generated with the light from the second light source. The deviation detection unit may be used as a correction signal generation unit that generates a signal for calibrating the phase deviation and the wavelength deviation between the spectrum signals by the plurality of wavelength sweeping light sources. The deviation detection unit may be a detection optical system.

For example, a detector may be installed in the deviation detection unit. The detector may detect the first spectrum signal corresponding to the first spectrum bandwidth swept by the first light source and detect the second spectrum signal corresponding to the second spectrum bandwidth swept by the second light source. As the detector, a single detector may detect the first and second spectrum signals or different detectors may detect first and second spectrum signals. The detected signal from the deviation detection unit may be converted from a wavelength space (wave number space) to a depth space so that a corrected image may be acquired.

As the deviation detection unit, for example, a deviation detection unit may be installed separately from the OCT optical system. In this case, for example, an optical system that generates interference signal light may be configured separately from the OCT optical system and may generate the first spectrum interference signal corresponding to the first spectrum bandwidth swept by the first light source and the second spectrum interference signal corresponding to the second spectrum bandwidth swept by the second light source. When a corrected image is obtained based on a detected signal from the deviation detection unit, the corrected image may be generated as an image different from an OCT image obtained by the OCT optical system. The light source unit may be configured to include the deviation detection unit. In this case, an SS-OCT light source including the plurality of wavelength sweeping light sources and the deviation detection unit may be manufactured as a single light source and may be mounted on the OCT apparatus.

The OCT optical system may also serve as the deviation detection unit. In this case, the first spectrum interference signal by the measurement light and the reference light corresponding to the first spectrum bandwidth swept by the first light source may be generated and the second spectrum interference signal by the measurement light and the reference light corresponding to the second spectrum bandwidth swept by the second light source may be generated. In this case, the corrected image may be generated as an OCT image. When the corrected image is output as the OCT image, the FPN occurring in the OCT image may be removed through predetermined noise processing.

The deviation detection unit may be able to detect a signal containing a plurality of pieces of FPN. The deviation detection unit may include, for example, an FPN generation optical member that generates first FPN and second FPN on an optical path. The FPN generation optical member may be, for example, an optical member formed to generate the first FPN and the second FPN at position separated from each other in regard to a depth direction.

Figure 2:
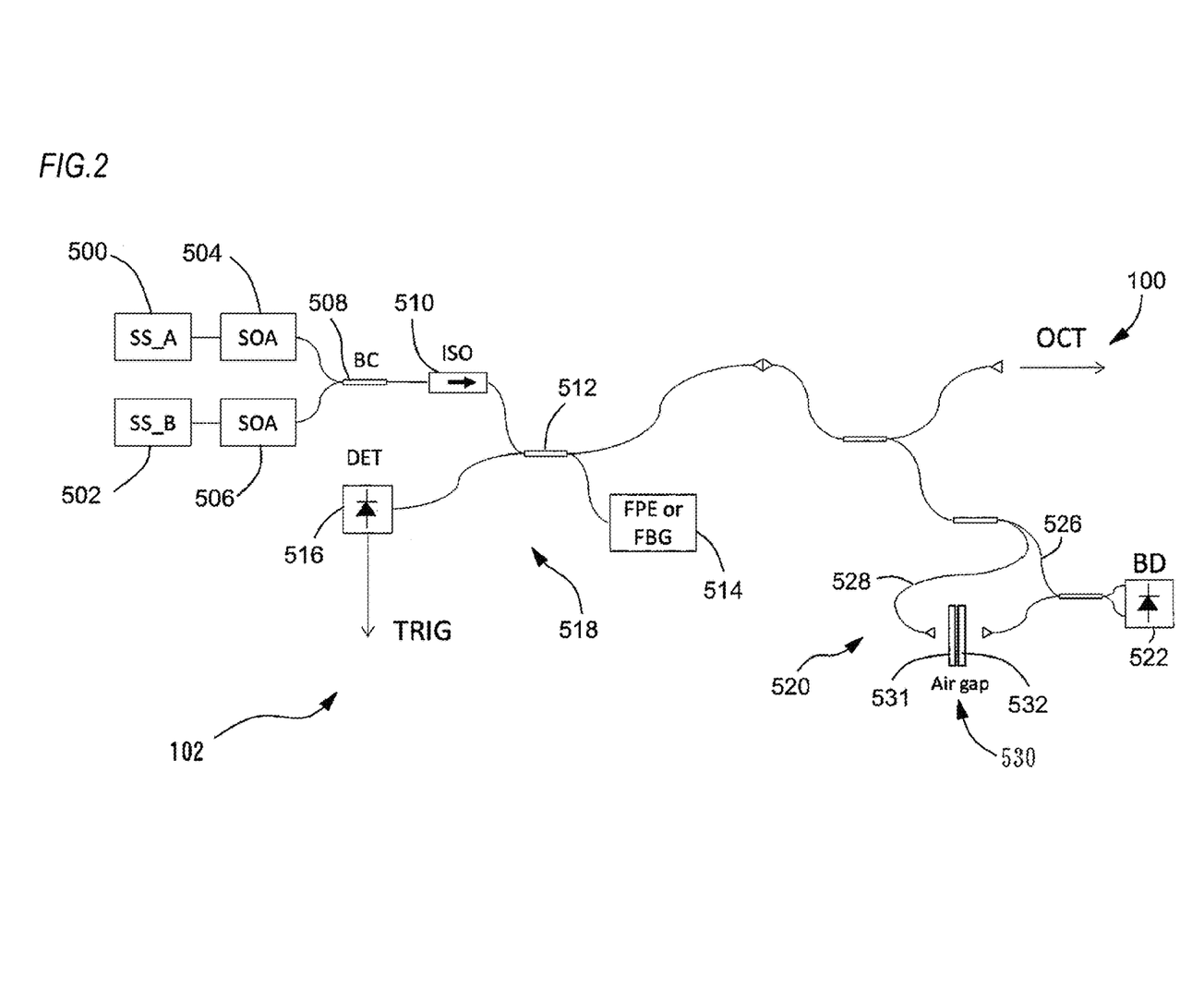
FIG. 2 is a diagram illustrating an example of an inner configuration of a light source unit 102.
Figure 10:
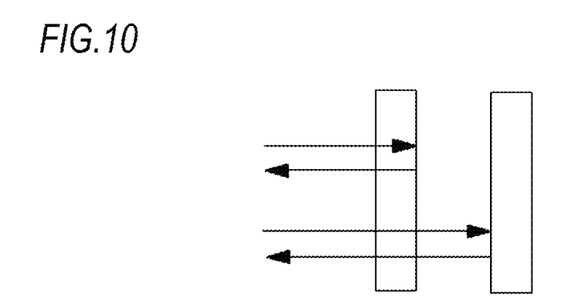
FIG. 10 is a diagram illustrating another example of an FPN generation optical member.
Figure 11:
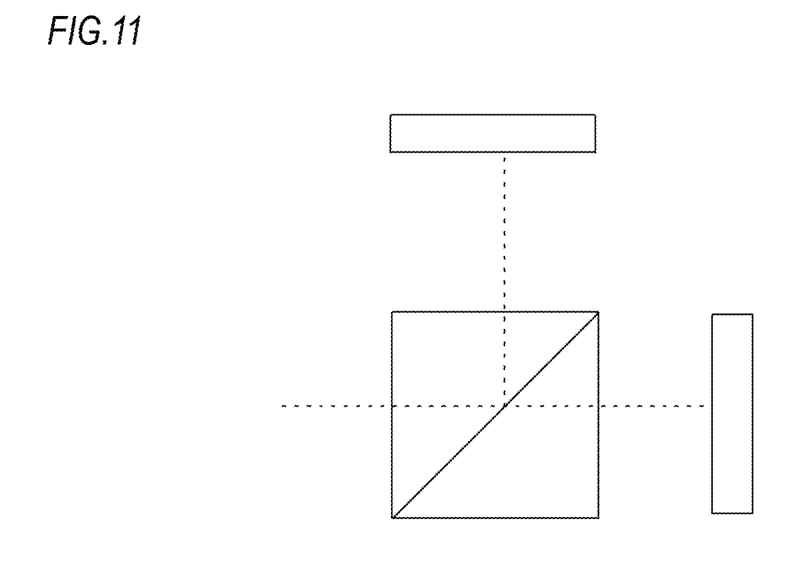
FIG. 11 is a diagram illustrating still another example of an FPN generation optical member.

For example, as the FPN generate optical members, an air gap may be installed on an optical path of a transmission system, and then a plurality of light transmission members (for example, cover glass) may be installed (see FIG. 2). A first optical member that is disposed on an optical path of a reflection system and transmits partial light and reflects partial light and a second optical member that is disposed on the optical path of the reflection system returns the light transmitted through the first optical member to the side of the first optical member may be included as the FPN generation optical members (see FIG. 10). In this case, the FPN generation optical member reflects the light from the light source unit to guide the light to the detector 522. The invention is not limited thereto and a beam splitter or the like may be used (see FIG. 11).

When the FPN generation optical members are disposed on an optical path of the deviation detection unit, the detected signal output from the detector of the deviation detection unit includes the first FPN and the second FPN. Here, for example, the first FPN is used to detect a phase deviation between the first and second spectrum signals and the second FPN may be used to detect the wavelength deviation between the first and second spectrum signals.

The deviation detection unit is not limited to the configuration in which the optical members generating the two pieces of FPN are included. The deviation detection unit may have a configuration in which optical members generating three or more pieces of FPN are included.

When a signal including a plurality of pieces of FPN is detected, the invention is not limited to the foregoing configuration. For example, in regard to at least one of the first FPN and the second FPN, FPN generated in accordance with a connection state (for example, a phase difference and a wavelength difference) between the spectrum interference signals may be used without using the FPN generation optical member.

In the configuration of the deviation detection unit, one of the first FPN and the second FPN may be detected by a deviation detection unit separate from the OCT optical system and the other of the first FPN and the second FPN may be detected by the OCT optical system.

<Calculation Process>

The OCT apparatus may include, for example, a calculation processing unit. For example, the calculation processing unit may sample an interference signal by combining the measurement light and the reference light according to a change in the emission wavelengths by the wavelength sweeping light sources and obtain an OCT image of a subject based on the interference signal at each wavelength obtained through the sampling.

In this case, the calculation processing unit may process the spectrum interference signal including the interference signal at each wavelength output from the detector of the OCT optical system. The calculation processing unit may obtain the OCT image of the subject by processing the spectrum interference signal. When the spectrum interference signal is processed to obtain the OCT image of the subject, Fourier transform may be used. The calculation processing unit may obtain a 2-dimensional OCT image by arranging A-scan OCT images obtained at different positions through scanning of the measurement light or the like. The obtained OCT image may be stored in a storage unit (memory) and may be displayed on a display unit.

The spectrum interference signal (spectrum interference data) may be rewritten as a function of a wavelength $\lambda$ and may be converted into functions $I(k)$ formed at an equal interval for a wave number $k$ ($=2\pi/\lambda$). The calculation processing unit may obtain a signal distribution in a depth (Z) region by performing Fourier transform on the spectrum interference signal in a wave number k space.

<Connection of Spectrum Signals>

In the embodiment, the calculation processing unit may connect the first and second spectrum interference signals output from the detector of the OCT optical system and may process the connected spectrum interference signals to acquire an OCT image. In this case, for example, the calculation processing unit may connect a time waveform of the first spectrum interference signal and a time waveform of the second spectrum interference signal.

When calculation processing unit processes the spectrum interference signals in which the spectrum interference signals by the plurality of wavelength sweeping light sources are connected, the calculation processing unit may obtain the phase deviation between the first and second spectrum signals by processing the first FPN included in the detected signal from the deviation detection unit. Further, the calculation processing unit may acquire the wavelength deviation between the first and second spectrum signals by processing the second FPN included in the detected signal from the deviation detection unit.

Here, the phase deviation and the wavelength deviation between the first and second spectrum signals can be obtained based on the detected signal from the deviation detection unit. As a result, the phase deviation and the wavelength deviation between the first and second spectrum interference signals detected by the detector of the OCT optical system can be obtained. The calculation processing unit that generates an OCT image and the calculation processing unit that obtains the phase deviation and the wavelength deviation may be different calculation processing units or the same calculation processing unit, or may be calculation processing units of which the configurations are partially overlapped.

Here, for example, the phase deviation and the wavelength deviation between the connected spectrum interference signals can be accurately obtained using the plurality of pieces of FPN without necessarily using an image of a plurality of frames.

When the FPN is processed to obtain the phase deviation and the wavelength deviation, for example, $\phi(k)$ in a spectrum signal at a position corresponding to the FPN may be obtained by analyzing the intensity level of the FPN. $\phi(k)$ indicates a change in a phase $\phi$ of a spectrum signal according to a sweeping wavelength (wave number). $\phi(k)$ may be represented with a function that has a wavelength k on the horizontal axis and a phase $\phi$ on the vertical axis. $\phi(k)$ may be obtained through extrapolation or interpolation in a wave number k region with small signal intensity by performing polynomial fitting on φ(k) in a wave number k region with large signal intensity (amplitude). For example, φ(k) may be obtained from an arc tangent of a ratio of a real part RealF to an imaginary part ImagF of Fourier conversion value (intensity value) F at a depth position corresponding to FPN. Here, the arc tangent of the ratio of the real part to the imaginary part of the Fourier conversion value through arc tangent processing can be calculated to obtain φ(k). The phase deviation and the wavelength deviation between the first and second spectrum signals are calculated by obtaining φ(k) in the first and second spectrum signals.

For example, the calculation processing unit may acquire the phase deviation by processing the first FPN and may acquire the wavelength deviation by processing the second FPN which is FPN generated at a position more distant from a zero delay position than the first FPN. In other words, the first FPN may be generated at a position closer to the zero delay position than the second FPN.

Here, in spectrum signals in the wavelength space (wave number space), the phase deviation is acquired using the FPN by the spectrum signal with a lower frequency and the wavelength deviation is acquired using the FPN by the spectrum signal with a higher frequency. A resolution at the time of detecting the phase deviation is ensured by using the FPN by the spectrum signal with the lower frequency in the detection of the phase deviation, and thus the phase deviation can be measured with high precision. On the other hand, a resolution at the time of detecting the wavelength deviation is ensured by using the FPN by the spectrum signal with the higher frequency in the detection of the wavelength deviation, and thus the wavelength deviation can be measured with high precision.

In consideration of the above description, the optical member generating the first FPN may be disposed on the optical path of the deviation detection unit so that the first FPN is formed at a position closer to the zero delay position. On the other hand, the optical member generating the second FPN may be disposed on the optical path of the deviation detection unit so that the second FPN is formed at a position more distant from the zero delay position.

When the phase deviation is obtained, for example, the calculation processing unit may acquire at least the phase deviation in a connection portion between the first and second spectrum signals by processing the first FPN.

For example, in regard to phase information in the connection region of the plurality of wavelength sweeping light sources, by acquiring a phase difference between the first and second spectrum signals when a phase difference at the time of continuously connecting the first and second spectrum signals is set to 0, a connection state regarding the phase between the first and second spectrum signals is detected. Here, the continuity of the first and second spectrum signals in regard to phase may be, for example, a state in which the phases of the first and second spectrum signals match each other in the connection region of the spectrum signals. In this case, the phases may not exactly match each other, but the phases may match so that an OCT image allowed for those skilled in the art can be acquired in some cases.

When the wavelength deviation is obtained, for example, the calculation processing unit may at least acquire the wavelength deviation in the connection portion between the first and second spectrum signals by processing the second FPN. In this case, the calculation processing unit may correct the phase deviation in the connection portion between the first and second spectrum signals obtained using the second FPN in advance by using the phase deviation obtained using the first FPN, and then may at least acquire the wavelength deviation in the connection portion between the first and second spectrum signals.

When the wavelength deviation is obtained, for example, the calculation processing unit may obtain, as the wavelength deviation, a temporal deviation between the wavelength sweeping by the first light source and the wavelength sweeping by the second light source. For example, in regard to wavelength information in the connection region of the plurality of wavelength sweeping light sources, by acquiring a wavelength difference (time difference) between the first and second spectrum signals when a temporal deviation at the time of continuously connecting the first and second spectrum signals is set to 0, a connection state regarding a wavelength between the first and second spectrum signals is detected. Here, the continuity of the first and second spectrum signals in regard to the wavelength may be, for example, a state in which the wavelengths (wave number) of the first and second spectrum signals match each other in the connection region of the spectrum signals. In this case, the wavelengths may not exactly match each other, but the wavelengths may match so that an OCT image allowed for those skilled in the art can be acquired in some cases.

When the plurality of pieces of FPN are processed, for example, the calculation processing unit may acquire a first corrected image which is based on the first spectrum signal and a second corrected image which is based on the second spectrum signal. The calculation processing unit may acquire φ(k) regarding the first spectrum signal in the first FPN and the second FPN by processing a plurality of pieces of FPN generated in the first corrected image and acquire φ(k) regarding the second spectrum signal by processing a plurality of pieces of FPN generated in the second corrected image in regard to the first FPN and the second FPN, respectively. The phase deviation and the wavelength deviation between the first and second spectrum interference signals output from the detector of the OCT optical system may obtained using the acquired φ(k).

For example, the calculation processing unit may obtain the phase deviation between the first and second spectrum interference signals output from the detector of the OCT optical system by obtaining the phase deviation between the connected spectrum signals based on the phase information regarding the first spectrum signal and the phase information regarding the second spectrum signal. For example, the calculation processing unit may obtain the wavelength deviation between the first and second spectrum interference signals output from the detector of the OCT optical system by obtaining the wavelength deviation between the connected spectrum signals based on the wavelength information regarding the first spectrum signal and the wavelength information regarding the second spectrum signal.

As described above, the corrected images are acquired with the first and second spectrum signals and the phase deviation and the wavelength deviation between the spectrum interference signals are obtained, but the invention is not limited thereto. For example, the calculation processing unit may connect the first and second spectrum signals, process a plurality of pieces of FPN obtained by processing the connected spectrum signals, and acquire φ(k) regarding the connected first and second spectrum signals in regard to the first FPN and the second FPN. For example, the phase deviation and the wavelength deviation between the first and second spectrum interference signals output from the detector of the OCT optical system may be obtained using the obtained φ(k).

In this case, for the phase deviation obtained based on the first FPN and the wavelength deviation obtained based on the second FPN, the phase information and the wavelength information corresponding to the first spectrum signal and the phase information and the wavelength information corresponding to the second spectrum signal may be determined using switch timings or the like obtained by a light emission detection unit or the like detecting the light emitted from the light source unit.

<Correction Between Connected Spectrum Interference Signals>

The OCT apparatus may include, for example, a correction unit that corrects the phase deviation and the wavelength deviation between the first and second spectrum interference signals based on the detected signal from the detection unit.

The calculation processing unit may also serve as the correction unit, may correct the connected spectrum interference signals based on the phase deviation and the wavelength deviation acquired by the calculation processing unit, or may acquire the OCT image by processing the connected spectrum signals in the phase deviation and the wavelength deviation are corrected. In this case, the calculation processing unit may acquire the OCT image by correcting the phase deviation and the wavelength deviation through signal processing and processing the connected spectrum signals in the corrected state.

The correction unit is not limited thereto. The phase deviation and the wavelength deviation between a spectrum emitted from the first wavelength sweeping light source and a spectrum emitted from the second wavelength sweeping light source may be corrected by controlling driving of the first and second wavelength sweeping light sources.

<Correction of Mapping State>

The calculation processing unit may obtain correction information for correcting mapping information of a wave number component to each sampling point of the first spectrum interference signal output from the detector of the OCT optical system, through calculation based on a signal component corresponding to the second FPN included in the detected signal output from the deviation detection unit. For example, the calculation processing unit may correct a correspondence relation between each wavelength component and each sampling point of the first spectrum interference signal using the obtained correction information.

The calculation processing unit may obtain correction information for correcting mapping information of a wave number component to each sampling point of the second spectrum interference signal output from the detector of the OCT optical system, through calculation based on a signal component corresponding to the second FPN included in the detected signal output from the deviation detection unit. For example, the calculation processing unit may correct a correspondence relation between each wavelength component and each sampling point of the second spectrum interference signal using the obtained correction information.

After the above-described correction of the mapping information is performed in advance, the OCT image may be acquired by obtaining the phase deviation and the wavelength deviation between the first and second spectrum signals and performing the deviation correction. When light sources for which a mapping state is appropriate are used as the first and second light sources, the mapping correction may not be necessarily performed and the phase deviation and the wavelength deviation between the first and second spectrum signals may be corrected. As a scheme of correcting the mapping information, for example, JP-A-2015-68775 may be referred to.

A subject may be not only an organism such as an eye (an anterior eye part, an ocular fundus, or the like) and a skin but also a material other than an organism.

EMBODIMENT

Figure 1:
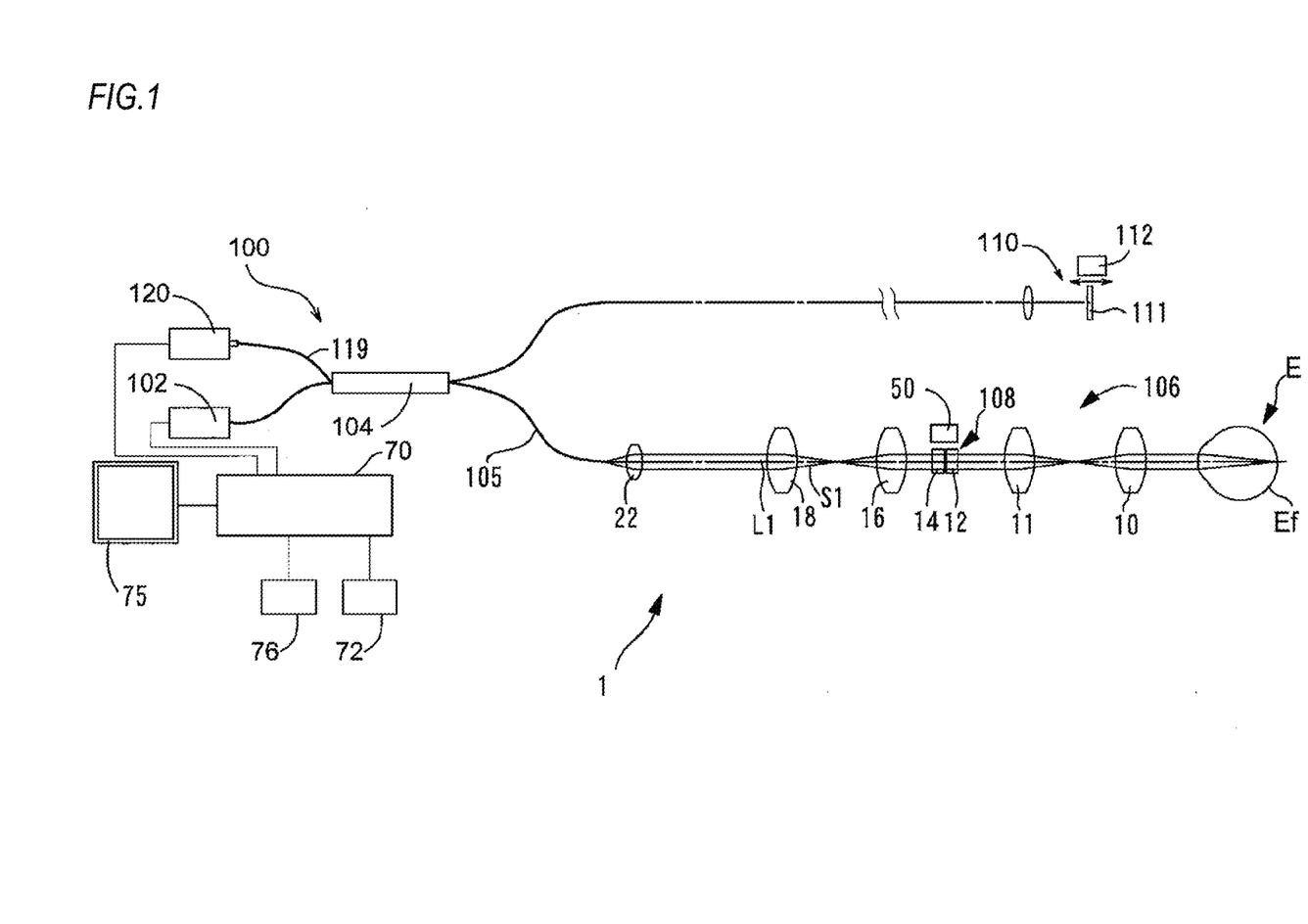
FIG. 1 is a schematic diagram illustrating a configuration of an optical coherence tomography apparatus according to an example.

An exemplary example of the embodiment will be described below. FIG. 1 is a schematic diagram illustrating a configuration of an optical coherence tomography apparatus according to the example.

An optical coherence tomography (OCT) apparatus 1 includes an interference optical system (OCT optical system) 100, a calculation control unit (CPU) 70, a memory 72, and a monitor 75. In addition, a front view observation system and a fixed view projection system (not illustrated) are installed in the OCT apparatus.

In the OCT optical system 100, a swept source-OCT (SS-OCT) scheme is used and a wavelength-variable light source (wavelength scanning light source) that changes an emission wavelength temporally at a high speed is used as a light source unit 102. The light source unit 102 changes the wavelength of emitted light. As a detector 120, for example, a balanced detector including a light-receiving element is installed. The light-receiving element is a point sensor including only a light-receiving unit. For example, an avalanche photodiode is used.

In the OCT optical system 100, light emitted from the light source unit 102 is split into measurement light (measurement light) and reference light by a coupler (splitter) 104.

In the OCT optical system 100, the measurement light is guided to an ocular fundus Ef of an eye E by a measurement optical system 106 and the reference light is guided to a reference optical system 110. The OCT optical system 100 causes the detector (light-receiving element) 120 to receive interference light acquired by combining the measurement light reflected from the ocular fundus Ef with the reference light.

In the measurement optical system 106, an optical fiber 105, a collimator lens 22, a focus lens 18, a collimator lens 16, an optical scanner 108, a relay lens 11, and an objective lens 10 are installed in sequence. The focus lens 18 is moved in an optical axis direction and is used to adjust focus on a subject.

After the measurement light from the optical fiber 105 is condensed by the focus lens 18, the measurement light is converted into a parallel beam by the collimator lens 16 and a reflection direction can be changed by the optical scanner 108 formed by galvanometer mirrors 14 and 12. Then, after the light deflected by the optical scanner 108 is condensed temporarily by the relay lens 11, the light is formed as a parallel beam by the objective lens 10, is incident on the eye E, and is incident on the ocular fundus Ef.

The optical scanner 108 scans the measurement light on the ocular fundus Ef in the XY direction (transverse direction). The optical scanner 108 is disposed at a substantially conjugated position with a pupil. The optical scanner 108 is, for example, the two galvanometer mirrors 12 and 14 and a reflection angle is arbitrarily adjusted by the driving mechanism 50.

The reflection (traveling) direction of a light flux emitted from the light source unit 102 is changed so that the light flux is scanned in any direction on the ocular fundus. As the optical scanner 108, an acoustic optical element (AOM) that changes the traveling (deflection) direction of the light is used in addition to a reflection mirror (a galvanometer mirror, a polygon mirror, or a resonant scanner).

Backscattered light (reflected light) of the measurement light from the ocular fundus Ef, is returned again to the coupler 104 via the objective lens 10 to the focus lens 18, and is combined with the reference light to interfere.

The reference optical system 110 generates the reference light combined with the reflected light acquired by reflecting the measurement light on the ocular fundus Ef. The reference optical system 110 may be a Michelson type system or may be a Mach-Zehnder type system. The reference optical system 110 is formed by, for example, by a catoptric system (for example, a reference mirror) and guides the light to the detector 120 by reflecting the light from the coupler 104 from a catoptric system to return the light again to the coupler 104. As another example, the reference optical system 110 is formed by a transmission optical system (for example, an optical fiber) and guides the light to the detector 120 by transmitting the light from the coupler 104 without returning the light.

The apparatus moves at least some of the optical members disposed in the OCT optical system 100 in the optical axis direction in order adjust an optical path length difference between the measurement light and the reference light. For example, the reference optical system 110 has a configuration in which the optical path length difference between the measurement light and the reference light is adjusted by moving an optical member (for example, a reference mirror 111) on the reference optical path. For example, the reference mirror 111 is moved in the optical axis direction through driving by the driving mechanism 112. The configuration for changing the optical path length difference may be disposed on a measurement optical path of the measurement optical system 106. An optical member (for example, an end of the optical fiber) disposed on the measurement optical path is moved in the optical axis direction.

An interference signal light in which the measurement light and the reference light are combined is passes through the optical fiber 119 and is received by the detector 120 via the coupler 104. The detector 120 detects the interference signal light.

When the emission wavelength is changed by the light source unit 102, the interference signal light corresponding to the change in the emission wavelength is received by the detector 120. As a result, the light is received as spectrum interference signal light by the detector 120. The spectrum interference signal output from the detector 120 is taken in the control unit 70 and OCT images (depth profiles) are formed based on the spectrum interference signal.

The control unit 70 controls driving of the optical scanner 108 such that the measurement light is scanned in the transverse direction on the ocular fundus Ef. The control unit 70 forms a 2-dimensional OCT image by sequentially arranging the OCT images (depth profiles) at scanning positions. The control unit 70 may be used as a calculation processing unit.

Hereinafter, a configuration and an operation when a plurality of wavelength sweeping light sources are installed as the light source unit 102 in the foregoing OCT apparatus will be described.

FIG. 2 is a diagram illustrating an example of an inner configuration of the light source unit 102. The light source unit 102 includes a first wavelength sweeping light source (hereinafter referred to as a first light source) 500 and a second wavelength sweeping light source (hereinafter referred to as a second light source) 502.

In regard to the first light source 500 and the second light source 502, the wavelength is swept in the first spectrum bandwidth by the first light source 500 and the wavelength is swept in the second spectrum bandwidth by the second light source 502. The first light source 500 and the second light source 502 sequentially emit light to sweep the wavelength with a broad bandwidth. The first light source 500 and the second light source 502 emit light at one cycle so that an A-scan signal can be obtained once. The first light source 500 and the second light source 502 are alternately switched repeatedly so that the A-scan signal is acquired repeatedly.

The light emitted from the first light source 500 is amplified by the first semiconductor optical amplifier (SOA) 504, and subsequently reaches the beam combiner 508. The light emitted from the second light source 502 is amplified by the second SOA 506, and subsequently reaches the beam combiner 508.

The light combined by the beam combiner 508 is rectified by an isolator (ISO) 510 and is subsequently divided by the coupler 512. One of the light divided by the coupler 512 travels toward the OCT optical system 100 and the other light travels toward a wavelength selection unit 514, and thus the light with a specific wavelength selected by the wavelength selection unit 514 is detected by a detector 516.

The wavelength selection unit 514 and the detector 516 may be used as a detection mechanism that detects light emission timings of the first light source 500 and the second light source 502. The wavelength selection unit 514 may have characteristics for reflecting a specific wavelength and, for example, a fiber Bragg grating (FBG) or fabry-perot etalon (FPE) may be used. For example, the wavelength selection unit 514 may have characteristics in which light with a starting end wavelength and a terminating end wavelength in a sweeping range of the first light source 500 and light with a starting end wavelength in a sweeping range of the second light source 502 are selectively guided to the detector 516. In this case, additionally, the wavelength selection unit 514 may have characteristics in which light with a terminating end wavelength in the sweeping range of the second light source 502 is selectively guided to the detector 516. The wavelength selection unit 514 may also be configured to select light at a starting end or a terminating end used for OCT imaging in the sweeping range of the wavelength sweeping light source without necessarily selecting light at the most starting end or the most terminating end of the sweeping range of the wavelength sweeping light source. The wavelength selection unit 514 may also be used to detect emission timings from the first light source 500 and the second light source 502 in regard to the wavelength in the connection region.

By detecting a timing at which the light is detected by the optical detector 516 using the foregoing detection mechanism, it is possible to detect a timing at which a predetermined wavelength bandwidth is reached in the wavelength sweeping by the first and second light sources.

A part of the light traveling toward the OCT optical system 100 travels toward a deviation detection unit 520. For example, the deviation detection unit 520 may be configured to detect the interference signal light in the detector 522. Here, the deviation detection unit 520 may include a first optical path 526 and a second optical path 528. For example, an FPN generation optical member 530 that generates a plurality of pieces of FPN may be disposed on the second optical path 528 which is one of the optical paths.

Whether the detected signal is taken in the detector 522 installed in the deviation detection unit (correction signal generation unit) 520 is controlled in accordance with a trigger signal output according to the detected signal from the detector 516. The detector 522 may be a balanced detector.

As the FPN generation optical member 530, for example, a plurality of pieces of cover glass 531 and 532 are disposed in a state in which an air gap is installed. Thus, light transmitted through the plurality of pieces of cover glass or reflected from the plurality of pieces of cover glass a plurality of times interferes in light passing along the first optical path, and thus two or more fixed pattern signals (FPN signals) are generated in the detector 522. A purpose for using the air gap is to equalize distributions and the air gap is not essential. The plurality of optical paths may not be necessarily installed, and an interference signal corresponding to the first FPN and the interference signal corresponding to the second FPN generated by disposing the plurality of glass plates on the optical path may be detected by the detector 522. In this case, an interference signal light corresponding to the first FPN may be generated by light transmitted through a first cover glass and internally reflected light, and an interference signal light corresponding to the second FPN may be generated by light transmitted through the second cover glass and internally reflected light.

Figure 3:
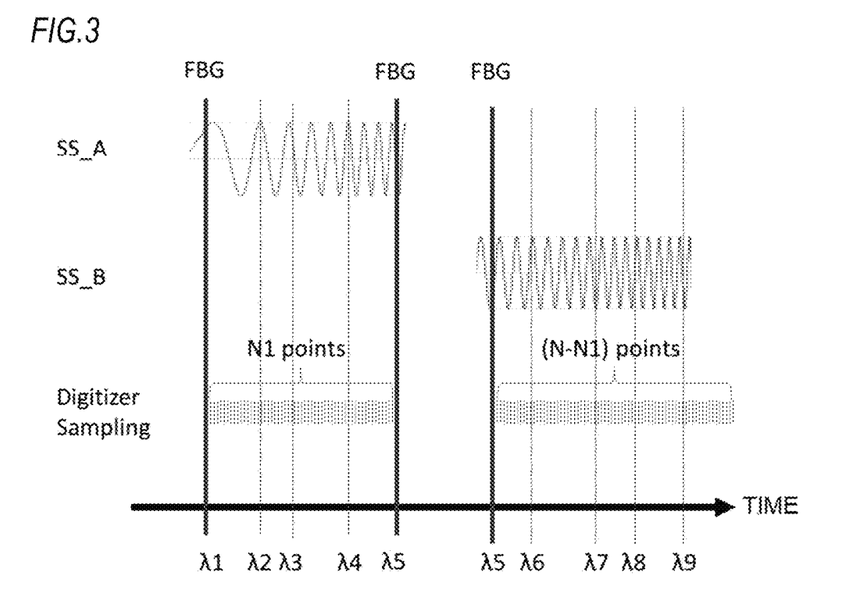
FIG. 3 is a time chart illustrating an example of an operation of the light source unit.

FIG. 3 is a time chart illustrating an example of an operation of the light source unit. The first light source 500 sequentially sweeps light with λ1 to λ5 and the light source 502 sequentially sweeps light with λ5 to λ9. Here, the wavelength selected by the wavelength selection unit 514 may be an emission wavelength common to the first light source 500 and the second light source 502 and may be set to, for example, the starting end wavelength λ1 of the first light source 500, the terminating end wavelength of the first light source 500, and the starting end wavelength λ5 of the second light source 502.

The wavelength selection unit 514 may be set to select the light with λ1. Thus, at a time point at which the light with λ1 is emitted from the first light source 500, the emitted light is detected in the detector 516. A signal by the detector 522 starts to be acquired using this emitted light as a trigger. Thereafter, the light from the first light source 500 is swept until the light has λ5. When the light from the first light source 500 reaches λ5, the light is detected by the detector 516. The acquisition of the signal by the detector 522 is temporarily stopped using this light as a trigger and stands by until the second light source 502 emits light.

As soon as the second light source 502 emits light, the light (λ5) selected by the wavelength selection unit 514 is detected again by the detector 516. The acquisition of the signal by the detector 522 is started again using this light as a trigger. Thereafter, at a time point at which the total number of sampling points of the first light source 500 and the second light source 502 in total reaches a predetermined number of points N, the re-acquisition may be stopped. For example, this may be realized using FPGA or the like. Of course, the wavelength selection unit 514 and the detector 522 may detect that the wavelength of the light from the second light source reaches λ9.

The detected signal detected by the detector 522 through the foregoing operation can be analyzed separately with the spectrum signal by the first light source 500 and the spectrum signal by the second light source 502. The detected signal detected by the detector 522 includes a plurality of pieces of FPN by the FPN generation optical member 530. The plurality of pieces of FPN may be used to obtain the phase deviation and the wavelength deviation between the first spectrum interference signal by the first light source 500 and the second spectrum interference signal by the second light source 502 output from the detector 120 of the OCT optical system 100.

In this case, the phase deviation and the wavelength deviation between the spectrum interference signal by the first light source and the spectrum signal by the second light source used to generate an OCT image may be corrected in accordance with the obtained phase deviation and wavelength deviation. As a result, the phase and the wavelength between the spectrum signal by the first light source and the spectrum interference signal by the second light source can be continuously connected.

For example, the phase deviation and the correction deviation may be detected and corrected as follows in accordance with the following scheme. The calculation control unit 70 obtains a change in the phase between the first and second signals from an FPN signal (an FPN signal close to a zero delay position) with a relatively low frequency included in the detected signal output from the detector 522.

Figure 4:
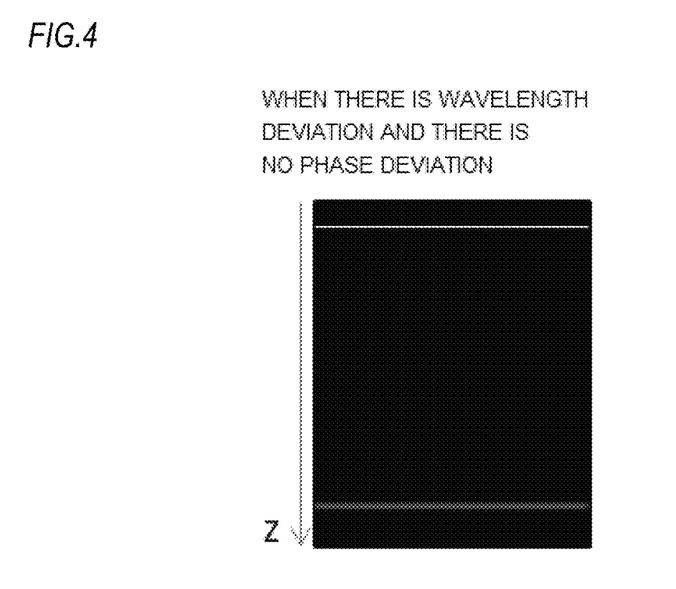
FIG. 4 is a diagram illustrating an example of a case in which a detected signal from a detector 522 is converted from a wavelength (wave number) space to a depth space and corrected image data is generated.
Figure 5:
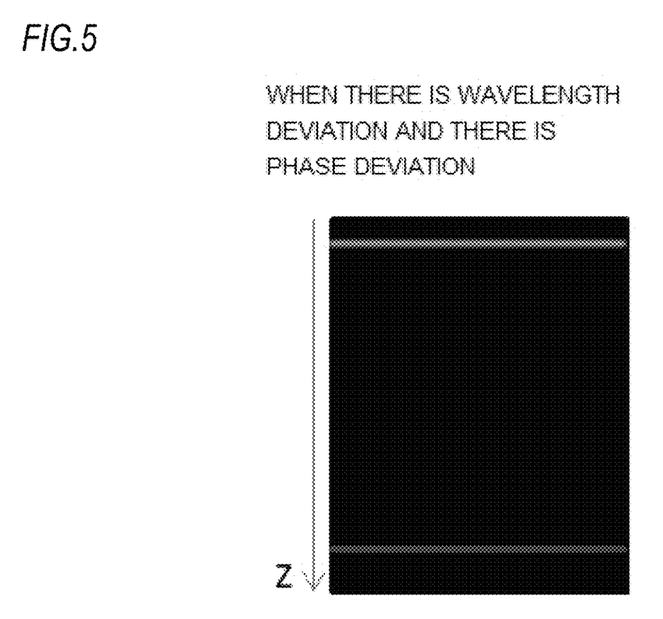
FIG. 5 is a diagram illustrating an example of a case in which the detected signal from a detector 522 is converted from a wavelength (wave number) space to a depth space and corrected image data is generated.
Figure 6:
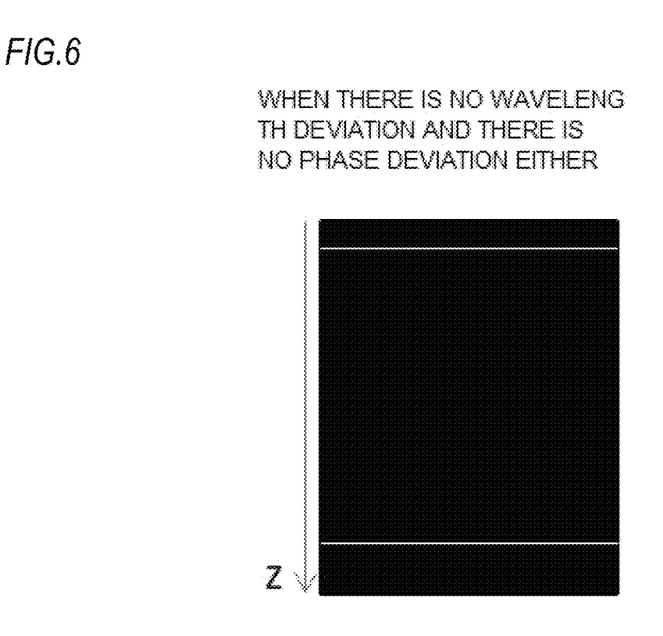
FIG. 6 is a diagram illustrating an example of a case in which the detected signal from a detector 522 is converted from a wavelength (wave number) space to a depth space and corrected image data is generated.

FIGS. 4 to 6 are diagrams illustrating examples of cases in which the detected signal from the detector 522 is converted from a wavelength (wave number) space to a depth space and corrected image data is generated. In this case, the description will be made assuming that correction of a mapping state in the first spectrum signal and correction of a mapping state in the second spectrum signal are performed in advance.

Here, when there is a relative difference in a wavelength between the first and second signals, an image deteriorates as the signals are more distant from the zero delay position. As a result, the FPN distant from the zero delay position deteriorates (see FIG. 4). On the other hand, when there is a relative difference in the phase between the first and second signals, an image deteriorates as a whole irrespective of the depth direction. Therefore, as a result, both the FPN close to the zero delay position and the FPN distant from the zero delay position deteriorate (see FIG. 5). When a wavelength difference between the first and second signals is zero, a first FPN 610 and a second FPN are image clearly (see FIG. 6).

Figure 7:
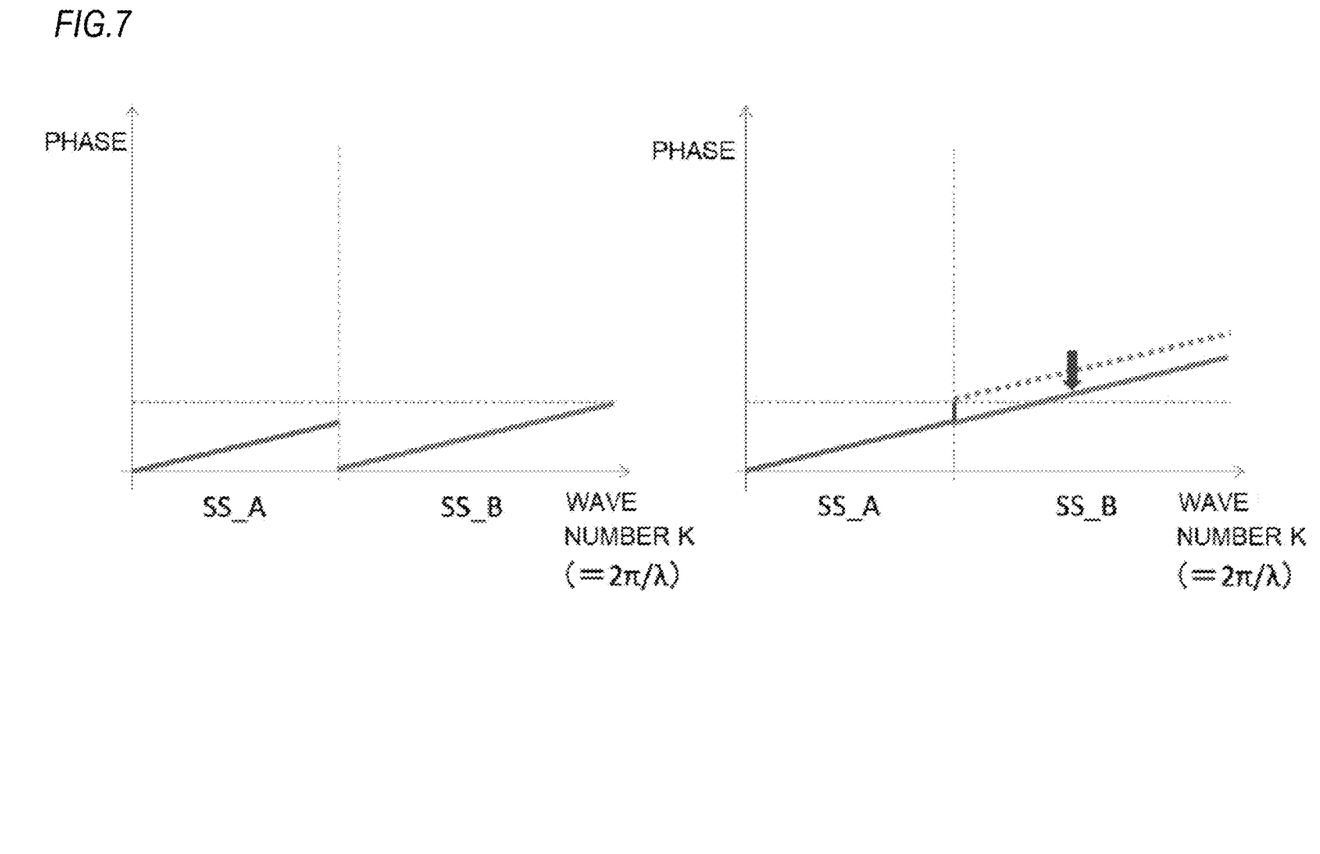
FIG. 7 is a diagram illustrating an example of a case in which a phase deviation between first and second spectrum signals is obtained.

FIG. 7 is a diagram illustrating an example of a case in which a phase deviation between first and second spectrum signals is obtained. In this case, the second spectrum signal may be shifted in regard to the phase so that the phases are matched in a connection region of the spectrum interference signals in a correspondence relation between the wavelength (wave number) and the phase for obtaining an OCT image.

Here, the first FPN is processed to obtain $\phi(k)$ in regard to the first FPN. In this case, a corrected image by the first light source 500 and a corrected image by the second light source 502 are acquired and the first FPN is analyzed in each corrected image, so that $\phi(k)$ by the first light source and $\phi(k)$ by the second light source may be obtained separately.

Here, in a region in which the frequency of a signal with a low frequency is close to zero, an initial phase difference between two wavelength sweeping light sources is dominant and an influence of a wavelength difference is small in regard to the detected phase deviation. Accordingly, for example, a change in the phase of the spectrum by the first light source and a change in the phase of the spectrum by the second light source are calculated. When the first light source 500 is in a state in which the phase is changed from 0 to $3\pi/4$ at the wavelength λ1 to λ5 and the second light source 502 is in a state in which the phase is changed from 0 to π at the wavelength λ5 to λ9, the phase deviation at λ5 which is a connection wavelength is calculated to −π/4. Thus, the phase deviation between the first and second spectrum signals is detected. In a case in which an unwrapping process of ignoring a wrap is performed, the phase deviation may be obtained.

For example, when the phase deviation is calculated to −π/4, the phase deviation between the first and second spectrum interference signals is corrected by shifting the second spectrum interference signal output from the detector 120 of the OCT optical system 100 by the phase deviation (−π/4) in the correspondence relation between the phase and the wavelength (wave number) for obtaining the OCT image. By applying the correction of the phase deviation not only to a signal at a depth position corresponding to the first FPN but also to a signal corresponding to a different depth position, the phase deviation between the first and second spectrum interference signals is corrected at each depth position.

Figure 8:
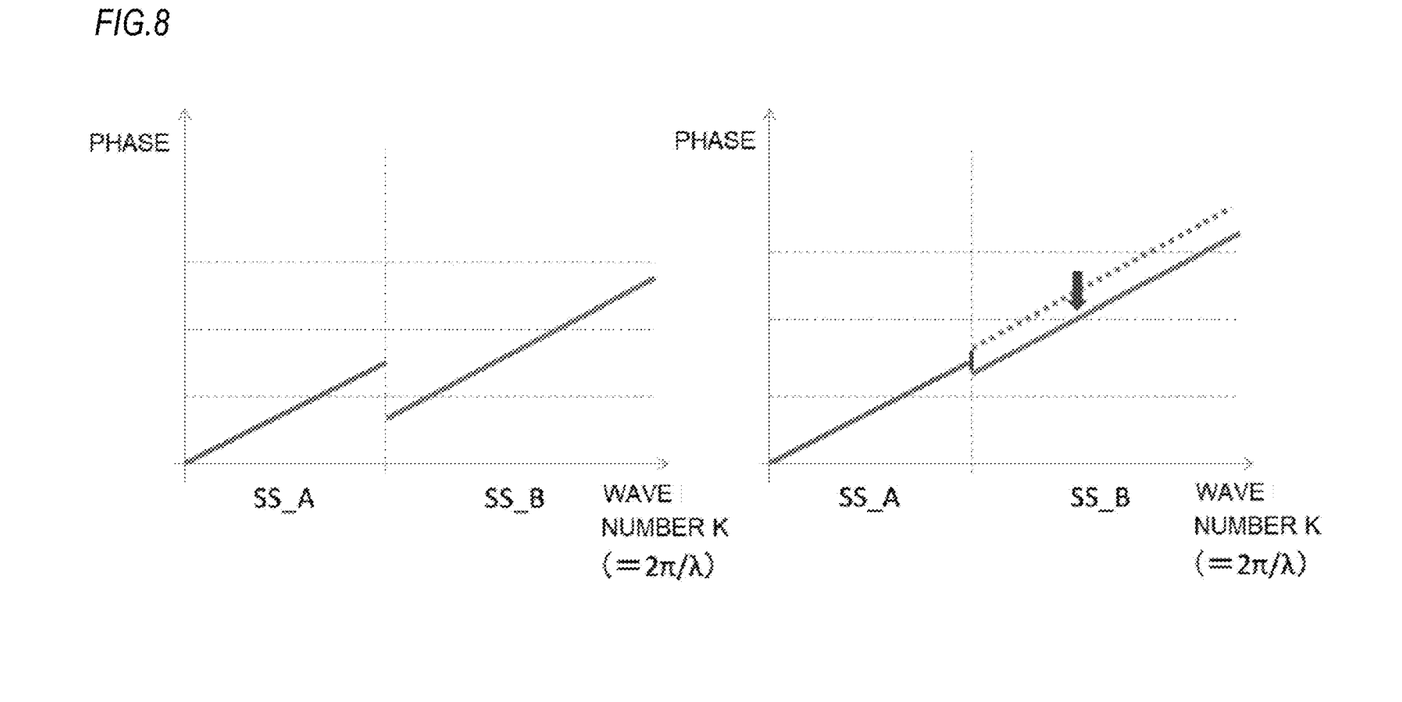
FIG. 8 is a diagram illustrating an example for describing a wavelength deviation between the first and second spectrum signals.

FIG. 8 is a diagram illustrating an example of a case in which a wavelength deviation between the first and second spectrum signals is obtained.

In this way, since the obtained relative phase difference also occurs at a high frequency, a change in the phase between the first and second spectrum signals is subsequently obtained from FPN with a relatively high frequency (FPN distant from zero delay).

Here, it is assumed that the FPN with a high frequency (the second FPN 620) is a double of the frequency of the first FPN. In this case, when there is no phase deviation and no wavelength deviation, a straight line of which a slope indicating a change in the phase with respect to the change in the frequency is double can be obtained. However, when the wavelength deviation remains in the state in which the phase deviation is corrected, a temporal deviation occurs between a change in the wave number of the first signal by the first light source and a change in the wave number of the second signal by the second light source in which an initial phase difference is considered.

Here, by correcting a temporal deviation between a wavelength change of the first spectrum interference signal and a wavelength change of the second spectrum interference signal output from the detector 120 of the OCT optical system 100, it is possible to correct a wavelength component through the entire frequency. For example, in a case of a light source in which a wavelength sweeping width is normally constant, the following method is used.

Figure 9:
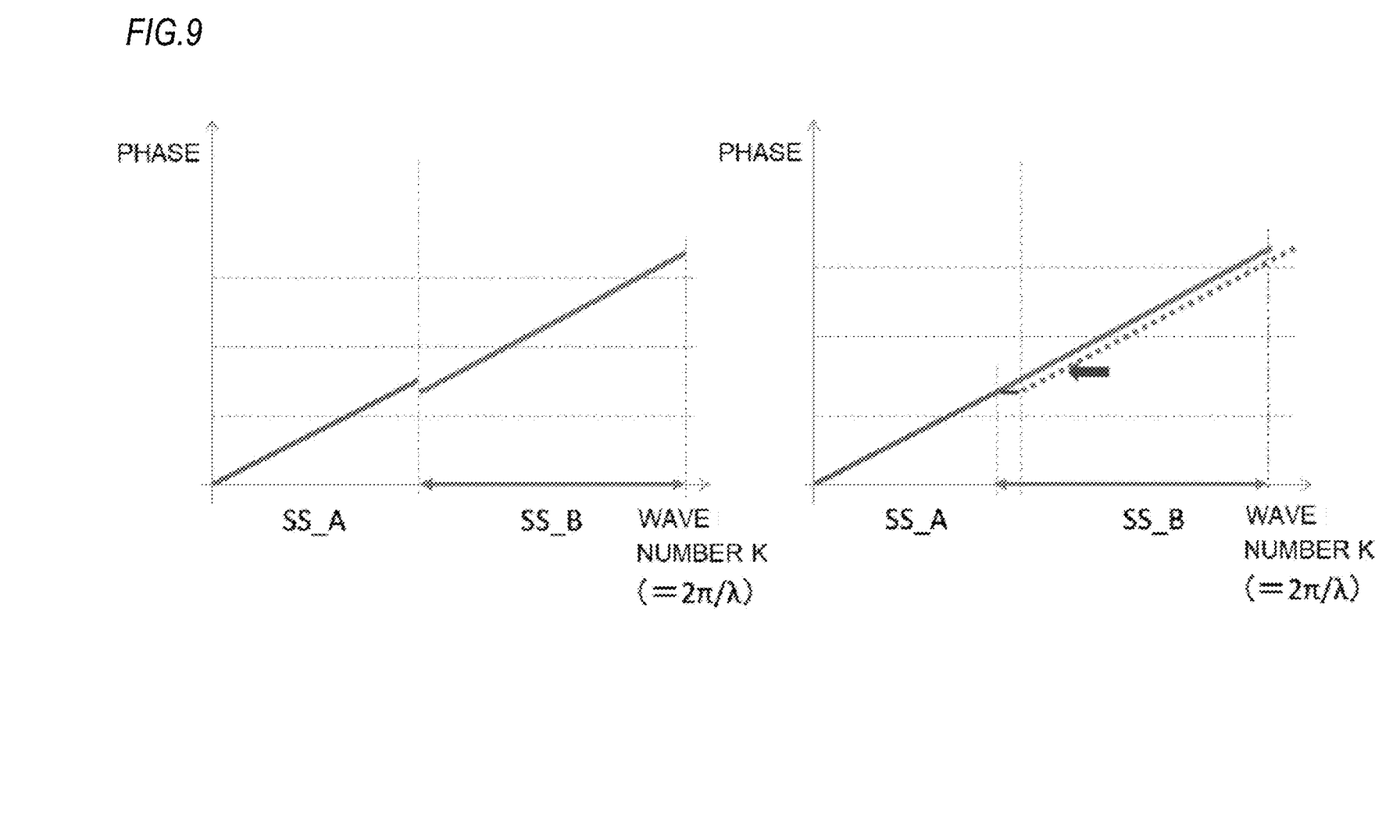
FIG. 9 is a diagram illustrating an example for correcting a wavelength difference between the first and second spectrum signals.

FIG. 9 is a diagram illustrating an example for correcting a wavelength difference between the first and second spectrum signals. In this case, in the correspondence relation between the phase and the wavelength (wave number) for obtaining an OCT image, the second spectrum signal may be shifted in regard to a wave number (wavelength) so that the wavelengths are matched in the connection region of the spectrum interference signals. Thus, the wavelength deviation between the first and second spectrum interference signals is corrected. By applying the correction of the wavelength deviation not only to a signal at a depth position corresponding to the second FPN but also to a signal corresponding to a different depth position, the wavelength deviation between the first and second spectrum interference signals is corrected at each depth position.

When the FPN is processed at a frequency of a signal with a relatively high frequency to obtain a wavelength difference, an influence of a phase difference (initial phase difference) between the first and second signals is considerably smaller than the wavelength difference. Therefore, the influence of the phase difference may be ignored in calculation.

In a signal with a relatively low frequency, a completely zero frequency may not be set. Therefore, by assuming that the wavelength deviation between the first and second spectrum interference signals remains, the initial phases and a wavelength deviation of signals with low and high frequencies may be simultaneously derived. In this case, an assumed value may be set for one value and a value matching a condition may be calculated for the other value. Alternatively, the phase deviation and the wavelength deviation may be derived so that both values fall in a given amount by alternately repeating such calculation processes as an iteration process.

In the foregoing description, the case in which the wavelength width to be swept is set to be fixed has been exemplified, but the invention is not limited thereto. For example, depending on characteristics of a light source, a wavelength width of k can be changed deciding a terminating end of the wave number k in some cases.

The invention claimed is:

1. An OCT apparatus comprising:
a light source unit that includes a first wavelength sweeping light source for sweeping an emission wavelength in a first spectrum bandwidth and a second wavelength sweeping light source sweeping an emission wavelength in a second spectrum bandwidth, the light source unit sequentially emitting the light with the first spectrum bandwidth and the light with the second spectrum bandwidth;
an SS-OCT optical system configured to split the light emitted from the first and second wavelength sweeping light sources into measurement light and reference light and configured to receive, by a first detector, interference signal light in which reflected light of the measurement light reflected from a subject is combined with the reference light;
a second detector that is a deviation detector configured to detect a phase deviation and a wavelength deviation between the first and second wavelength sweeping light sources, the second detector detecting a signal including a plurality of pieces of fixed pattern noise (FPN);
a processor; and
memory storing computer readable instructions, when executed by the processor, causing the OCT apparatus to execute:
connecting a first spectrum interference signal by the first wavelength sweeping light source and a second spectrum interference signal by the second wavelength sweeping light source output from the first detector, processing the connected spectrum interference signals to acquire an OCT image and obtaining the phase deviation and the wavelength deviation by processing the plurality of pieces of FPN included in the detected signal from the second detector; and
correcting the phase deviation and the wavelength deviation between the first and second spectrum interference signals based on the detected signal from the second deviation detector, the phase deviation and the wavelength deviation being obtained by the calculation processor.

2. The OCT apparatus according to claim 1, wherein the phase deviation is obtained by processing first FPN and the wavelength deviation is obtained by processing second FPN.

3. The OCT apparatus according to claim 2,
wherein the second detector includes an optical member to generate at least one of the first FPN and the second FPN on an optical path.

4. The OCT apparatus according to claim 2,
wherein the phase deviation is obtained by processing the first FPN and the wavelength deviation is obtained by processing the second FPN which is FPN generated at a position more distant from a zero delay position than the first FPN.

5. The OCT apparatus according to claim 1,
wherein a temporal deviation between wavelength sweeping by the first wavelength sweeping light source and wavelength sweeping by the second wavelength sweeping light source is obtained as the wavelength deviation.

6. The OCT apparatus according to claim 1,
wherein the connected spectrum signals are corrected based on the obtained phase deviation and wavelength deviation and the connected spectrum signals in a state in which the phase deviation and the wavelength deviation are corrected; are processed to acquire the OCT image.

7. The OCT apparatus according to claim 1,
wherein the phase deviation and the wavelength deviation between spectra emitted from the first wavelength sweeping light source and a spectrum emitted from the second wavelength sweeping light source are corrected by controlling driving of the first and second wavelength sweeping light sources.

8. The OCT apparatus according to claim 1, further comprising:
a third detector that detects light emitted from the light source unit and detects switching between the first and second wavelength sweeping light sources.

9. The OCT apparatus according to claim 1,
wherein the second detector is installed separately from the first detector.

10. The OCT apparatus according to claim 1,
wherein the first detector also serves as the second detector.

11. The OCT apparatus according to claim 1,
wherein the first and second wavelength sweeping light sources are each a VCSEL light source.

12. The OCT apparatus according to claim 1,
wherein the light source unit includes the second detector.

13. The OCT apparatus according to claim 1,
wherein the second detector includes an optical member generating at least two pieces of FPN including the first FPN and the second FPN on an optical path.

* * * * *